United States Patent
Yoshino et al.

(10) Patent No.: US 8,740,584 B2
(45) Date of Patent: Jun. 3, 2014

(54) INDUCTION MOTOR AND HERMETIC COMPRESSOR

(75) Inventors: Hayato Yoshino, Chiyoda-ku (JP); Koji Yabe, Chiyoda-ku (JP); Kazuhiko Baba, Chiyoda-ku (JP); Tomoaki Oikawa, Chiyoda-ku (JP); Takahiro Tsutsumi, Chiyoda-ku (JP); Yoshikazu Fujisue, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 179 days.

(21) Appl. No.: 12/996,910

(22) PCT Filed: Aug. 5, 2008

(86) PCT No.: PCT/JP2008/063986
§ 371 (c)(1),
(2), (4) Date: Dec. 8, 2010

(87) PCT Pub. No.: WO2010/016106
PCT Pub. Date: Feb. 11, 2010

(65) Prior Publication Data
US 2011/0081263 A1  Apr. 7, 2011

(51) Int. Cl.
*H02K 1/32* (2006.01)
*H02K 9/02* (2006.01)

(52) U.S. Cl.
USPC .................. 417/410.1; 310/61; 310/60 A

(58) Field of Classification Search
USPC ......... 417/410.1, 410.3, 366, 423.7; 310/210, 310/211, 212, 216, 61, 55, 54, 52, 60 A
See application file for complete search history.

(56) References Cited

U.S. PATENT DOCUMENTS

| 980,986 | A | 1/1911 | Meyer |
|---|---|---|---|
| 1,650,795 | A | 11/1927 | Johnson |
| 1,708,909 | A | 4/1929 | Spencer |
| 1,771,936 | A | 7/1930 | Morrill |

(Continued)

FOREIGN PATENT DOCUMENTS

| CN | 1326052 A | 12/2012 |
|---|---|---|
| DE | 1563345 A1 | 3/1970 |

(Continued)

OTHER PUBLICATIONS

JP08205438A_MachineTranslation.*

(Continued)

*Primary Examiner* — Bryan Lettman
(74) *Attorney, Agent, or Firm* — Buchanan Ingersoll Rooney PC

(57) ABSTRACT

An induction motor includes a stator having a winding to be inserted to a plurality of stator slots formed along an inner circumferential edge of a stator iron core; and a rotor placed inside of the stator via a gap, the rotor includes a plurality of double squirrel-cage rotor slots formed along an outer circumferential edge of the rotor iron core and filled with conductive material and at least three air hole parts provided around a rotating shaft hole of the rotor iron core to which the rotating shaft is fitted and having an opening which is open to the rotating shaft hole; and an inner diameter part of the end ring which short circuits both edges of the conductive material filled to the double squirrel-cage rotor slot is placed to be adjacent to the air hole part in at least the end ring of one side.

9 Claims, 16 Drawing Sheets

(56) References Cited

U.S. PATENT DOCUMENTS

| | | | |
|---|---|---|---|
| 1,957,551 A | 5/1934 | Nierlich | |
| 1,996,460 A * | 4/1935 | Coates | 310/62 |
| 2,139,748 A | 12/1938 | Harrell | |
| 2,292,167 A | 7/1940 | Smith | |
| 2,370,458 A | 2/1945 | Goran | |
| 2,803,763 A * | 8/1957 | Dunn | 310/54 |
| 3,401,291 A | 9/1968 | Lackey | |
| 4,454,438 A | 6/1984 | Yamashita et al. | |
| 4,585,967 A * | 4/1986 | Mayer et al. | 310/216.123 |
| 4,782,260 A | 11/1988 | Gandhi et al. | |
| 4,801,832 A * | 1/1989 | Neumann | 310/216.111 |
| 5,182,483 A | 1/1993 | Hibino et al. | |
| 5,334,923 A | 8/1994 | Lorenz et al. | |
| 5,572,080 A | 11/1996 | Nakamura et al. | |
| 5,898,250 A | 4/1999 | Sugita et al. | |
| 5,986,366 A * | 11/1999 | Bailey et al. | 310/52 |
| 6,058,596 A | 5/2000 | Jansen et al. | |
| 6,088,906 A * | 7/2000 | Hsu et al. | 310/211 |
| 6,533,558 B1 * | 3/2003 | Matsumoto et al. | 417/410.3 |
| 6,582,207 B2 * | 6/2003 | Matsumoto et al. | 417/410.1 |
| 7,112,908 B2 | 9/2006 | Takita et al. | |
| 7,294,949 B2 | 11/2007 | Han et al. | |
| 7,709,991 B2 * | 5/2010 | Ionel et al. | 310/216.001 |
| 7,868,509 B2 * | 1/2011 | Yoshino et al. | 310/216.055 |
| 8,035,273 B2 * | 10/2011 | Ionel et al. | 310/261.1 |
| 8,080,908 B2 * | 12/2011 | Matsubara et al. | 310/61 |
| 8,319,388 B2 * | 11/2012 | Yoshino et al. | 310/212 |
| 8,344,581 B2 * | 1/2013 | Yabe et al. | 310/216.069 |
| 2003/0071533 A1 | 4/2003 | Kikuchi et al. | |
| 2003/0102762 A1 | 6/2003 | Jansen et al. | |
| 2003/0107288 A1 * | 6/2003 | Takita et al. | 310/211 |
| 2003/0173861 A1 * | 9/2003 | Kawaguchi et al. | 310/261 |
| 2004/0084984 A1 | 5/2004 | Yanashima et al. | |
| 2004/0119367 A1 | 6/2004 | Hiwaki et al. | |
| 2007/0210668 A1 * | 9/2007 | Yoshino et al. | 310/216 |
| 2007/0247015 A1 * | 10/2007 | Dellinger | 310/217 |
| 2009/0289521 A1 * | 11/2009 | Yoshino et al. | 310/216.071 |
| 2010/0247347 A1 | 9/2010 | Yoshino et al. | |
| 2010/0253174 A1 | 10/2010 | Yabe et al. | |
| 2011/0070108 A1 * | 3/2011 | Arita et al. | 417/410.1 |
| 2011/0140565 A1 * | 6/2011 | Yabe et al. | 310/211 |
| 2012/0269667 A1 * | 10/2012 | Sakima et al. | 417/423.7 |

FOREIGN PATENT DOCUMENTS

| | | | |
|---|---|---|---|
| FR | 564927 A | | 4/1923 |
| JP | 47-029503 U | | 12/1972 |
| JP | 51-071915 A | | 6/1976 |
| JP | 52039106 A | | 3/1977 |
| JP | 54-148207 | | 11/1979 |
| JP | 54-148207 A | | 11/1979 |
| JP | 56-003559 A | | 1/1981 |
| JP | 58-176540 U | | 11/1983 |
| JP | 59-010159 A | | 1/1984 |
| JP | 60-162434 A | | 8/1985 |
| JP | 61-244248 A | | 10/1986 |
| JP | 62-068468 U | | 4/1987 |
| JP | 62-189929 A | | 8/1987 |
| JP | 62189929 A * | | 8/1987 |
| JP | 63-234850 A | | 9/1988 |
| JP | 64-047565 U | | 3/1989 |
| JP | 01-129738 A | | 5/1989 |
| JP | 2-007771 U | | 1/1990 |
| JP | 02-41672 U | | 3/1990 |
| JP | 03-230740 A | | 10/1991 |
| JP | 04-244762 A | | 9/1992 |
| JP | 05-43753 U | | 6/1993 |
| JP | 06-153471 A | | 5/1994 |
| JP | 08-140319 | | 5/1996 |
| JP | 08-140319 A | | 5/1996 |
| JP | 08-205438 A | | 8/1996 |
| JP | 08205438 A * | 8/1996 | H02K 1/27 |
| JP | 9-224358 A | | 8/1997 |
| JP | 10-004658 | | 1/1998 |
| JP | 10-004658 A | | 1/1998 |
| JP | 11-299188 A | | 10/1999 |
| JP | 2003-125567 A | | 4/2003 |
| JP | 2003-158839 A | | 5/2003 |
| JP | 2003-333812 A | | 11/2003 |
| JP | 2004-201428 | | 7/2004 |
| JP | 2004-201428 A | | 7/2004 |
| KR | 10-2006-0027707 A | | 3/2006 |
| TW | 340983 | | 9/1998 |
| TW | 571487 B | | 1/2004 |

OTHER PUBLICATIONS

JP08205438A_Machine Translation (Aug. 1996).*
Office Action dated Jan. 19, 2012, issued in the corresponding Taiwanese Patent Application No. 097128787, and a partial English Translation thereof. (10 pages).
First Office Action issued by the Chinese Patent Office on Feb. 3, 2012 in corresponding Chinese Application No. 2008801106792, and a partial English-translation thereof.
Cao et al., "Influence of rotor slot and material on IMCCR operating performances", vol. 11, No. 6, No. 2007, and an English translation of portions particularly referred to in the First Office Action issued on by the Chinese Patent Office on Feb. 3, 2012 in corresponding Chinese Application.
Office Action issued by the Japanese Patent Office on Apr. 24, 2012 in corresponding Japanese Application No. 2010-523665, and a partial translation thereof.
Partial English translation of JP 2003-158839A including parts in the Apr. 24, 2012 Japanese Office Action cited above.
Office Action from U.S. Patent Office issued in copending U.S. Appl. No. 13/034,229 on Apr. 27, 2011.
Office Action issued by the Korean Patent Office on Mar. 9, 2012 in corresponding Korean Application No. 10-2011-7000213, and partial English-language translation thereof.
Koji Yabe et al., "Induction Motor Rotor, Induction Motor, Compressor, Fan, and Air Conditioner", copending U.S. Appl. No. 13/034,229, filed Feb. 24, 2011.
International Search Report (PCT/ISA/210) for PCT/JP2008/059127 dated Aug. 12, 2008, in copending U.S. Appl. No. 12/744,622 (US 2010/0253174 A1).
Office Action (Notice of Rejection) dated Nov. 2, 2010, issued in the copending Japanese Patent Application No. 2009-547920, and an English-language translation thereof.
International Search Report (PCT/ISA/210) for PCT/JP2008/063986 dated Nov. 18, 2008.
Office Action from U.S. Patent Office issued in copending U.S. Appl. No. 12/744,622 on Mar. 11, 2011.
Notice of Reasons for Rejection dated Jun. 12, 2012 issued by the Japanese Patent Office in corresponding Japanese Application No. 2009-550418, and a partial English translation thereof (5 pages).
Second Office Action dated Jun. 4, 2012 issued by the Chinese Patent Office in corresponding Chinese Application No. 200880100719.5, and a partial English translation thereof (17 pages).
Office Action dated Apr. 26, 2012 issued by the U.S. Patent and Trademark Office in corresponding U.S. Appl. No. 12/742,718.
Official Action dated Apr. 25, 2011, issued by the Korean Patent Office in corresponding Korean Patent Application No. 10-2010-7007521, and partial English language translation of the Official Action.
International Search Report (Form PCT/ISA/210) for PCT/JP2008/059126 dated Aug. 12, 2008.
Official Action dated Jul. 11, 2011, issued by the US Patent Office in corresponding U.S. Appl. No. 12/744,622.
Office Action dated Aug. 25, 2011, issued in the corresponding Chinese Patent Application No. 200880100719.5, and an English Translation thereof.
International Search Report (PCT/ISA/210) for PCT/JP2008/063986 dated Nov. 18, 2008, in copending U.S. Appl. No. 12/996,910.
Notification of Reasons for Refusal issued Dec. 20, 2011 by the Japanese Patent Office in corresponding Japanese Patent Application No. 2009-550418, and English-language translation thereof.

(56) References Cited

OTHER PUBLICATIONS

Second Office Action issued on Sep. 24, 2012 by the Chinese Patent Office in corresponding Chinese Application No. 2008801106792, and an English translation thereof.
First Office Action dated Dec. 28, 2012 issued by the Chinese Patent Office in corresponding Chinese Application No. 200880130451.X, and an English translation of the text portion thereof.
Partial English translation of Taiwanese Office Action issued Nov. 9, 2011 in a corresponding Taiwanese application.
Official Action dated Jan. 9, 2012 issued in corresponding U.S. Appl. No. 12/742,718.
Official Action dated Nov. 4, 2011 issued in corresponding U.S. Appl. No. 12/744,622.
Partial translation of JP 8-205438A, 1996.
Partial translation of JP 10-4658A, 1998.
Chinese Office Action dated Sep. 5, 2013, issued by the Chinese Patent Office in corresponding Chinese Patent Application No. 200880130451X, and English language translation of Office Action. (20 pages).
Extended European Search Report dated Feb. 21, 2014, issued by the European Patent Office in corresponding European Patent Application No. 08764338.3 (8 pgs).

* cited by examiner

INDUCTION MOTOR AND HERMETIC COMPRESSOR

TECHNICAL FIELD

The present invention relates to an induction motor having a double squirrel-cage rotor and a hermetic compressor.

BACKGROUND ART

In a conventional induction motor, it has been known that two notches are provided to an inner diameter part of a rotor iron core, the notches are used for a lubricant passage notch, so that a die-cast rotor can be produced precisely (refer to Patent Document 1, for example).

Further, in another conventional induction motor, an end-ring is elongated to an inner diameter area of the rotor iron core, and then a vent hole is formed on the end ring and the rotor iron core, so that mechanical strength can be improved without generating a nest inside the end ring (refer to Patent Document 2, for example).

Patent Document 1: JP59-10159
Patent Document 2: JP61-244248

DISCLOSURE OF THE INVENTION

Problems to be Solved by the Invention

In a conventional induction motor, an inner diameter part of a rotor iron core has two notches, so that when fitting the rotor iron core to a rotating shaft by shrink-fit, large distortion occurs in the rotor iron core, which causes a problem that sufficient fitting strength cannot be obtained.

Further, according to another conventional induction motor, a part of an end ring and the rotor iron core is cut using a drill after die-casting the end ring, which causes a problem that the process cost is expensive.

The present invention is provided to solve the above problems and aims to obtain a highly efficient induction motor without degrading the fitting strength of shrink-fit and having high starting torque and a highly reliable hermetic compressor with suppressing oil amount flowing out of the hermetic compressor.

Means to Solve the Problems

According to the present invention, an induction motor having a stator iron core produced by laminating a predetermined number of electromagnetic steel plates which has been punched out into a predetermined form, a plurality of stator slots formed along an inner circumferential edge of the stator iron core, and windings inserted into the stator slots, the induction motor is characterized to include:

a rotor placed inside of the stator via a gap, the rotor includes:

a rotor iron core produced by laminating a predetermined number of electromagnetic steel plates which has been punched out into a predetermined form;

a plurality of double squirrel-cage rotor slots formed along an outer circumferential edge of the rotor and filled with conductive material; and at least three air hole parts provided around a rotating shaft hole of the rotor iron core to which a rotating shaft is fitted and having an opening which is open to the rotating shaft hole, and an inner diameter part of at least one of end rings which short circuit both edges of the conductive material filled into the double squirrel-cage rotor slots is placed adjacent to the air hole parts.

Further, the induction motor of the invention is characterized in that the rotor and the rotating shaft are fitted by shrink-fit.

Further, it is characterized in that the air hole parts are almost semi-circular shaped.

Further, it is characterized in that the air hole parts are elongate hole shaped.

Further, the induction motor of the invention is characterized in that notches are provided to the rotating shaft in an almost axial direction throughout the shaft at locations facing the air hole parts provided to the rotor, and the air hole parts and the notches form air holes.

Further, the induction motor of the invention is characterized in that the notches provided to the rotating shaft in an almost axial direction throughout the shaft are elongate hole shaped.

Further, it is characterized in that the rotor iron core is laminated with skew, and the notches are slanted corresponding to askew angle of the rotor iron core.

Further, it is characterized in that three of the air hole parts are placed with an almost equal interval, so that $2\alpha+\beta<180$ degrees, where an angle formed by both edges of one of the air hole parts and a center of the rotor shaft is $\alpha$, and an angle formed by two edges of a closer side of two adjacent air hole parts and the center of the rotor shaft is $\beta$.

Further, it is characterized in that the induction motor contained in a hermetic container together with a compressor element for compressing refrigerant and driving the compressor element by the rotating shaft, and the compressor element includes discharge holes for discharging the refrigerant compressed, a number of holes and locations of the discharge holes and the air hole parts are matched, and locations of the discharge holes and the air hole parts are almost matched when high-pressure discharge gas is discharged from the discharge hole.

Further, a hermetic compressor of the invention is characterized to include the induction motor and a compressor element to be driven by the induction motor.

Effect of the Invention

In an induction motor related to the present invention, at least three air holes provided around a rotating shaft hole of a rotor iron core to which a rotating shaft is fitted and having an opening which is open to the rotating shaft hole and an inner diameter part of the end ring which short circuits both edges of conductive material filled into double squirrel-cage rotor slots are placed adjacent to the air holes, so that it is possible to obtain an induction motor whose starting torque is high and which operates highly efficiently at the time of normal operation.

PREFERRED EMBODIMENTS FOR CARRYING OUT THE INVENTION

Embodiment 1

Hereinafter, the first embodiment will be explained with reference to the drawings. FIGS. 1 through 7 show the first embodiment: FIG. 1 is a cross sectional view of an induction motor 100; FIG. 2 is a cross sectional view of a rotor slot 40 in which an aluminum bar 30 is filled; FIG. 3 is a perspective view of a rotor 11 of the induction motor 100; FIG. 4 is a plan view of the rotor 11 of the induction motor 100; FIG. 5 is a plan view of a rotor iron core 11*a* of the induction motor 100; FIG. 6 is a plan view of the rotor 11 of a deformed example of the induction motor 100; and FIG. 7 is a plan view of the rotor iron core 11*a* of the deformed example of the induction motor 100.

The induction motor 100 shown in FIG. 1 is a two-pole single-phase induction motor. The induction motor 100 includes a stator 12 and a rotor 11.

The stator 12 includes a stator iron core 12*a* and a main winding 20*b* and an auxiliary winding 20*a* to be inserted to a stator slot 12*b* of the stator iron core 12*a*.

Here, although in order to secure insulation between the windings (the main winding 20*b* and the auxiliary winding 20*a*) and the stator iron core 12*a*, insulating material (for example, slot cell, wedge, etc.) is inserted to the stator slot 12*b*, illustration is omitted here.

After punching out an electromagnetic steel plate having thickness of 0.1-1.5 mm into a predetermined form, the stator iron core 12*a* is formed by laminating a predetermined number of electromagnetic steel plates in an axial direction, and fixing with riveting, or welding, etc.

A stator slot 12*b* is formed along an inner circumferential edge of the stator iron core 12*a*. The stator slots 12*b* are provided with an almost equally interval in a circumferential direction.

The stator slot 12*b* exists in an elongated radial direction. The stator slot 12*b* has an opening at the inner circumferential edge. This opening is called a slot opening. The windings (the main winding 20*b* and the auxiliary winding 20*a*) are inserted from the slot opening. In an example of FIG. 1, the stator slot 12*b* includes twenty four stator slots 12*b*.

The main winding 20*b* is a winding of a concentric winding system. In the example of FIG. 1, the main winding 20*b* is placed at an inner circumferential side (the closer side to the rotor 11) of the stator slot 12*b*. Here, the main winding 20*b* of the concentric winding system is formed by five coils having different sizes (in particular, a length in a circumferential direction). Then, the five coils are inserted into the stator slot 12*b* so that the centers of the five coils should be at the same position. Therefore, it is called as the concentric winding system. Although the main winding 20*b* of the five coils is illustrated, it is merely one of examples, and any number of coils can be used.

The five coils of the main winding 20*b* are assumed to be M1, M2, M3, M4, and M5 in a descending order of the size (from the coil having a slot pitch 11). The selection is done so that the distribution should form an approximate sign wave. This is because the magnetic flux of the main winding, which occurs when the electric current flows the main winding 20*b*, should be a sign wave.

The main winding 20*b* can be provided at either the inner circumferential side or the outer circumferential side of the stator slot 12*b*. If the main winding 20*b* is provided at the inner circumferential side of the stator slot 12*b*, the circumferential length of the winding becomes shorter compared with a case of providing at the outer circumferential side of the stator slot 12*b*. Further, if the main winding 20*b* is provided at the inner circumferential side, the leakage flux becomes smaller compared with a case of providing at the outer circumferential side of the stator slot 12*b*. And thus, if the main winding 20*b* is provided at the inner circumferential side of the stator slot 12*b*, impedance (resistance value, leakage reactance) becomes smaller compared with a case of providing at the outer circumferential side of the stator slot 12*b*. Therefore, characteristics of the induction motor 100 are improved.

By running the electric current to the main winding 20*b*, main winding flux is generated. The direction of the main winding flux is an up/down direction of FIG. 1. As discussed above, the number of windings of the five coils (M1, M2, M3, M4, and M5) of the main winding 20*b* is selected so that the waveform of the main winding flux should become a sign wave as much as possible. Since the electric current flowing in the main winding 20*b* is alternate current, the size and the direction of the main winding flux may change according to the electric current which flows in the main winding.

Further, the auxiliary winding 20*a* of the concentric winding system is inserted to the stator slot 12*b* similarly to the main winding 20*b*. In FIG. 1, the auxiliary winding 20*a* is provided at the outer side of the stator slot 12*b*. By running the electric current to the auxiliary winding 20*a*, auxiliary winding flux is generated. The direction of the auxiliary winding flux is orthogonal to the direction of the main winding flux (a left/right direction of FIG. 1). Since the electric current flowing in the auxiliary winding 20*a* is alternate current, the size and the direction of the auxiliary winding flux may change according to the electric current which flows in the auxiliary winding.

In general, the main winding 20*b* and the auxiliary winding 20*a* are inserted into the stator slot 12*b* so that an angle formed by the main winding flux and the auxiliary winding flux should be 90 degrees in the electric angle (here, the mechanic angle is also 90 degrees, since the number of poles is two).

In the example of FIG. 1, the auxiliary winding 20*a* is formed by three coils having different sizes (in particular, the length in the circumferential direction). It is assumed that the three coils are A1, A2, and A3 in the descending order from the largest (the coil having a slot pitch 11). The selection is done so that the distribution should form an approximate sign wave. This is because the auxiliary magnetic flux which occurs when the electric current flows the auxiliary winding 20*a* should be a sign wave.

Then, the three coils (A1, A2, and A3) are inserted into the stator slot 12*b* so that the centers of the three coils should be at the same position.

The main winding 20*b* is connected in parallel to a connection in series of the auxiliary winding 20*a* and a driving capacitor (not illustrated). Both ends are connected to a single-phase alternating current source. By connecting the driving capacitor in series to the auxiliary winding 20*a*, it is possible to shift the phase of the electric current which flows in the auxiliary winding 20*a* by approximate 90 degrees forward from the phase of the electric current which flows in the main winding 20*b*.

By displacing 90 degrees in the electric angle of the auxiliary winding 20*a* from the main winding 20*b* in the stator iron core 12*a*, and by displacing 90 degrees in the phase of the electric current of the auxiliary winding 20*a* and the main winding 20*b*, two-pole revolving magnetic field is generated.

Four stator notches 12*c*, which are formed to be approximate straight lines by cutting the outer circumferential form with approximate straight lines, are provided at the outer circumference of the stator iron core 12*a*. The four stator notches 12*c* are provided so that two notches being next to each other should be placed orthogonal. However, this is merely one of examples; the number and the location of the stator notches 12*c* can be arbitrarily chosen.

When the induction motor 100 of FIG. 1 is used for a hermetic compressor, the stator 12 is shrink-fitted to an inner circumference of a cylindrical hermetic container of the hermetic compressor. Inside of the hermetic compressor, a refrigerant passes through the induction motor 100. Therefore, the induction motor 100 needs a passage of the refrigerant. By forming the stator notch 12c, the passage of the refrigerant is formed between the stator 12 and the hermetic container. Other than the passage of the stator notch 12c of the outer circumferential surface of the stator iron core 12a, the passage of the refrigerant of the induction motor 100 includes, for example, an air hole part 11b of the rotor 11 and a gap 60 between the stator 12 and the rotor 11.

Further, the rotor 11 includes a rotor iron core 11a and a squirrel-cage secondary conductor. The rotor iron core 11a is formed by punching out electromagnetic steel plates having thickness of 0.1-1.5 mm into a predetermined shape and laminating in an axial direction similarly to the stator iron core 12a. Normally, the electromagnetic steel plate of the inner side of the stator iron core 12a is used.

Generally, the rotor iron core 11a is punched out from the same material with the stator iron core 12a; however, different material from the stator iron core 12a can be used for the rotor iron core 11a.

The rotor iron core 11a includes a double squirrel-cage rotor slot 40 including an outer layer slot 40a provided along the outer circumferential edge of the rotor iron core 11a, an inner layer slot 40b provided at the inner circumferential side of the outer layer slot 40a, and a connection slot 40c connecting the outer layer slot 40a and the inner layer slot 40b at the outer circumferential side in the radial direction (refer to FIG. 2).

In the example of FIG. 1, the number of rotor slots 40 is thirty. Namely, the induction motor 100 of FIG. 1 includes a combination of the stator iron core 12a having twenty four slots and the rotor iron core 11a having thirty slots. However, this is merely one of examples, a combination of the number of slots of the stator iron core 12a and the number of slots of the rotor iron core 11a is not limited to the above example.

It is known that there are abnormal phenomena such as synchronous torque, asynchronous torque, vibration/noise, etc. in a squirrel-cage induction motor. It is obvious that the abnormal phenomena of the squirrel-cage induction motor is caused by space harmonics in air-gap flux density; the following two events can be considered as causes of generation of the space harmonics. One is harmonics included in magnetomotive force itself because of arrangement of the winding; and the other is harmonics included in the air-gap flux density caused by irregularity of permeance (an inverse number of magnetic resistance) since a groove exists.

Like this, in the squirrel-cage induction motor, a combination of the number of stator slots and the number of rotor slots is closely related to the abnormal phenomena such as synchronous torque, asynchronous torque, vibration/noise, etc. Therefore, it is necessary to carefully choose a combination of the number of stator slots and the number of rotor slots.

By casting aluminum of conductive material to an outer layer slot 40a, an inner layer slot 40b, and a connection slot 40c, an aluminum bar 30 including an outer layer aluminum bar 30a, an inner layer aluminum bar 30b, and a connection aluminum bar 30c is formed. Aluminum is generally used for the conductive material; however, copper can be used. Or, other than die-casting, another method can be used, in which the bar is inserted to the slot and then an end ring is united to the bar.

A double squirrel-cage secondary conductor is formed with an end ring 32 (see FIG. 3) provided at an edge in the laminating direction of the rotor 11. Generally, the aluminum bar 30 and the end ring 32 are produced by casting aluminum with die-casting to the aluminum bar 30 and the end ring 32 at the same time.

As shown in FIGS. 1, 4, and 5, an almost semi-circular air hole part 11b connecting to a rotating shaft hole 31 is provided around the circular shaped rotating shaft hole 31 of the rotor iron core 11a. The almost semi-circular air hole part 11b has an opening at the rotating shaft hole 31. In examples of FIGS. 1, 4, and 5, six almost semi-circular air hole parts 11b are formed. Three or more air hole parts 11b (at three locations) should be provided.

When the rotor 11 is mounted on the hermetic compressor, the rotor 11 is fixed by shrink-fit and a cavity is formed with the rotating shaft by the air hole part 11b. This cavity is used as a part of a flow passage of refrigerant. Generally, in order to secure the performance of the hermetic compressor, a certain amount of flow passage of refrigerant is necessary in the motor.

The induction motor 100 having the double squirrel-cage rotor 11 has general characteristics as follows. Namely, at the time of starting, slip frequency (a difference between frequency of rotating magnetic field and the number of rotations of the rotor 11) is high. Leakage flux of the inner layer aluminum bar 30b is more than leakage flux of the outer layer aluminum bar 30a. At the time of starting when the slip frequency is high, current distribution is decided by reactance amount, and secondary current mainly flows in the outer layer aluminum bar 30a. Therefore, secondary resistance is increased, and thus starting torque is increased, which improves the starting characteristic.

Further, at the time of normal operation, since the slip frequency is low, the secondary current flows throughout the aluminum bar 30, aluminum cross section becomes large, and thus the secondary resistance is decreased. Consequently, secondary copper loss is decreased, and thus the characteristic to improve the efficiency is gained.

Further, the starting torque of a single-phase induction motor driven by single-phase alternating current source tends to be lower compared with a three-phase induction motor driven by three-phase alternating current source.

For decreasing the secondary resistance, there is a method to increase a volume of the end ring 32; and for increasing the volume, there are a method to increase the volume in the height direction (axial direction) and a method to increase the volume toward the inner diameter side.

When the height direction of the end ring 32 is increased, the length in the laminating direction (axial direction) of the rotor 11 is increased, and thus the length of the whole motor is increased, which may cause a problem to enlarge the motor.

Further, when the rotor 11 of which the end ring 32 is enlarged toward the inner diameter side is mounted on the hermetic compressor, there is a problem that there is no space to provide an air hole at the rotor 11.

In the rotor 11 of the induction motor 100 according to the present embodiment, it is possible to enlarge the end ring 32 toward the inner diameter side by providing an almost semi-circular air hole part 11b connecting to the rotating shaft hole 31 around the circular rotating shaft hole of the rotor iron core 11a.

By enlarging the end ring 32, the secondary resistance is decreased, which enables to obtain highly efficient induction motor 100, and when the induction motor 100 is mounted on the hermetic compressor, it is possible to obtain the hermetic compressor of high performance with securing the flow passage of refrigerant.

Further, another case in which the air hole is not provided at the rotor 11 is considered. When the rotor 11 without the air hole is mounted on the hermetic compressor, the stator notch 12c provided at an outer circumference of the stator 12 and the gap 60 between the stator 12 and the rotor 11 are to be the flow passage of refrigerant.

In the hermetic compressor, refrigerating oil, which is necessary for lubricating each sliding part of a compressor mechanism part, is reserved together with the refrigerant in the lower part of the hermetic container, and thus a part of the refrigerating oil may possibly flow out of the hermetic container together with the refrigerant to inflow to the refrigerant circuit of the refrigerant cycle device.

When excessive amount of refrigerating oil inflows to the refrigerant circuit of the refrigerant cycle device other than the compressed refrigerant (oil amount flowing out of the hermetic compressor is increased), the performance of the refrigerant cycle device is degraded, and lubrication of each part of the compressor mechanism is degraded (deficient), which causes malfunction of the hermetic compressor, and thus may possibly decrease the reliability of the compressor.

If no air hole is provided in the rotor 11, the flowing speed of the refrigerant is increased because the flow passage area of the refrigerant is small, and the refrigerating oil together with the refrigerant tends to flow out through the stator notch 12c of the stator 12. By enlarging the stator notch 12c, the flowing speed can be suppressed; however, when the stator notch 12c is enlarged, the magnetic path area of the stator notch 12c is decreased, and the magnetic flux density of the stator iron core 12a is increased. When the magnetic flux density is large, exciting current and iron loss are increased, and thus an input to the induction motor 100 is increased, which degrades the efficiency of the motor.

In the present embodiment, the almost semi-circular air hole part 11b connecting to the rotating shaft hole 31 is provided around the circular rotating shaft hole 31 of the rotor iron core 11a, and the end ring 32 is enlarged toward the inner diameter side to decrease the secondary resistance. Therefore, it is possible to obtain a highly reliable hermetic compressor which suppresses the oil amount flowing out of the hermetic compressor and it is also possible to obtain a highly efficient hermetic compressor which mounts the low loss induction motor 100. Here, it is sufficient to enlarge the end ring 32 of one side in case of enlarging the end ring 32 toward the inner diameter side.

The almost semi-circular air hole part 11b connecting to the rotating shaft hole 31 is provided around the circular rotating shaft hole 31 of the rotor iron core 11a, and the end ring 32 is enlarged toward the inner diameter side to decrease the secondary resistance; this can be expressed in the following when simplifying the secondary resistance as R2, the resistance of the aluminum bar 30 as Rbar, the resistance of the end ring 32 as Rring:

$$R2 = k1 \times (Rbar + Rring) \quad (1)$$

Here, k1 is a resistance coefficient.

Further, the resistance Rring of the end ring 32 is proportional to an average diameter Dr of the end ring 32, and is inversely proportional to a cross section area Ar of the end ring 32. That is:

$$Rring = k2 \times Dr/Ar \quad (2)$$

Here, k2 is a coefficient.

Therefore, if the end ring 32 is enlarged toward the inner diameter side, the average diameter Dr of the end ring 32 is decreased, and the cross section area Ar of the end ring 32 is increased, which decreases the resistance Rring of the end ring 32.

Even if the end ring 32 is enlarged toward the inner diameter side, the resistance Rbar of the aluminum bar 30 does not change; however, by decreasing the resistance Rring of the end ring 32, the secondary resistance R2 can be decreased.

If the cross section area of the end ring is enlarged using a rotor having a common rotor slot shape which is not double squirrel-cage (ordinary squirrel-cage), the secondary resistance is decreased, and thus the efficiency at the time of normal operation is improved; however, there is a problem that the starting torque of the induction motor is decreased.

If the starting torque of the induction motor is decreased, high power supply voltage is necessary to obtain the same starting torque. When the power supply voltage is lowered for some reason, there may be a case that the induction motor cannot be started.

In the present embodiment, the rotor 11 having the double squirrel-cage rotor slot 40 is used. Therefore, it is possible to obtain the highly reliable induction motor 100 securing the starting torque, and it is also possible to obtain the highly efficient induction motor 100 at the time of normal operation. In particular, it is possible to obtain larger effect when applying to a single-phase induction motor driven by the single AC source. This is because the starting torque/breakdown torque (maximum torque) of the single-phase induction motor is smaller compared with the three-phase induction motor.

As another method to simply increase the starting torque, there is a method to increase a capacity of the operation capacitor being connected in series to the auxiliary winding 20a of the single-phase induction motor. Further, there is also another method using an outer circuit of the single-phase induction motor to provide a starting capacitor and a relay in parallel to the operation capacitor. However, either method involves higher cost.

In the present embodiment, since the rotor 11 having the double squirrel-cage rotor slot 40 is used to increase the starting torque, there is no need to use the outer circuit in particular. Therefore, it is possible to obtain the low-cost induction motor 100 as the operation system including circuits such as the operation capacitor, etc.

Next, a deformed example of the air hole part 11b of the rotor iron core 11a will be explained. An air hole part 11b of the rotor iron core 11a shown in FIGS. 6 and 7 is elongate hole shaped (almost ellipse). Three air hole parts 11b being elongate hole shaped (almost ellipse) are provided with almost equal intervals in the circumferential direction. However, the number of the air hole parts 11b is not limited to three. The number of air hole parts 11b, the length of the circumferential direction, and the length of the radial direction are arbitrarily chosen.

By forming the air hole part 11b as elongate hole shaped, if the total area of air holes is the same, the dimension of the elongate hole shaped air hole part 11b in the diameter direction can be shortened compared with the almost semi-circular air hole parts 11b shown in FIG. 4, which enables to enlarge the end ring 32 toward the inner diameter side with the shortened amount.

The elongate hole shaped air hole part 11b enables the end ring 32 to enlarge more toward the inner diameter side than the almost semi-circular air hole part 11b of FIG. 4. Therefore, the secondary resistance can be further decreased, and it is possible to obtain the further highly efficient induction motor 100.

In the present embodiment, aluminum is used as material for the secondary conductor; however, any conductive material can be used, and further copper, etc. which is material with less resistance can be used.

Or it is also possible to cast aluminum by die-casting after filling bar type copper material to the inner layer slot 40b.

The concentric winding has been shown as the winding 20 (the main winding 20b, the auxiliary winding 20a) inserted to the stator slot 12b; however, the same effect can be obtained by a lap winding method or a wave winding method.

The single-phase induction motor driven by the single-phase AC source has been explained; however, the same effect can be obtained by the three-phase induction motor driven by the three-phase AC source.

Further, the structure of the double squirrel-cage shape including the outer layer slot 40a, the inner layer slot 40b, and the connection slot 40c has been explained; however, the same effect can be obtained by another structure of the double squirrel-cage rotor slot 40 including the outer layer slot 40a and the inner layer slot 40b separated by the rotor iron core 11a without providing the connection slot 40c.

As has been discussed, according to the present embodiment, by providing the almost semi-circular air hole part 11b connecting to the rotating shaft hole 31 around the circumference of the circular rotating shaft hole 31 of the rotor iron core 11a of the induction motor 100, the end ring 32 can be enlarged toward the inner diameter side, the enlargement of the end ring 32 reduces the secondary resistance, thus the highly efficient induction motor 100 can be obtained, and when the induction motor 100 is mounted on the hermetic compressor, the hermetic compressor of high performance can be also obtained with securing the flow passage of the refrigerant.

Further, by providing the almost semi-circular air hole part 11b connecting to the rotating shaft hole 31 around the circumference of the circular rotating shaft hole 31 of the rotor iron core 11a of the induction motor 100, it is unnecessary to enlarge the stator notch 12c of the stator 12 to a size enough for the refrigerating oil together with the refrigerant to flow through the stator notch 12c, thus the highly reliable hermetic compressor can be obtained with suppressing the oil amount flowing out of the hermetic compressor, and the highly efficient hermetic compressor mounting the low loss induction motor 100 can be also obtained.

Further, by forming the air hole part 11b as elongate hole shaped, if the total area of air holes is the same, the dimension of the elongate hole shaped air hole part 11b in the diameter direction can be shortened compared with the almost semi-circular air hole parts 11b shown in FIG. 4, which enables to enlarge the end ring 32 toward the inner diameter side with the shortened amount and further reduce the secondary resistance, and moreover, the more highly efficient induction motor 100 can be obtained.

Further, by increasing the starting torque using the rotor 11 having the double squirrel-cage rotor slot 40, there is no need to use a special outer circuit, and thus the low cost induction motor 100 can be obtained as the operation system including circuits such as the operation capacitor, etc.

Embodiment 2

Hereinafter, the second embodiment will be explained with reference to the figures. FIGS. 8 through 11 show the second embodiment; FIG. 8 is a plan view of the rotor 11 of the induction motor 100; FIGS. 9 and 10 are perspective views of a part (a part corresponding to the length of the rotor 11 in the laminating direction) of a rotating shaft 50; and FIG. 11 is a plan view of the rotor 11 of the induction motor 100.

In FIG. 8, a notch 50a is provided to a rotating shaft 50 at a position facing to the air hole part 11b provided to the rotating shaft hole 31 of the rotor 11. The notch 50a is formed in full length of the rotating shaft 50 in an almost axial direction.

The notch 50a of the rotating shaft 50 is placed facing to the air hole part 11b provided to the rotating shaft hole 31 of the rotor 11. Then, one notch 50a of the rotating shaft 50 and one air hole part 11b form one air hole. In the example shown in FIG. 8, six air holes are formed.

When the induction motor 100 is mounted on the hermetic compressor, the rotor 11 is shrink-fitted to the rotating shaft 50. If the air hole part 11b is provided to the rotating shaft hole 31 of the rotor 11, an arc part other than the air hole part 11b is shrink-fitted to the rotating shaft 50, and the air hole part 11b is not shrink-fitted.

By providing the notch 50a to the rotating shaft 50 at the location facing the air hole part 11b as shown in FIG. 9, it is possible to increase the flow passage area for the refrigerant with the amount of the notch 50a without degrading the fitting strength of the shrink-fit.

When the flow passage area is made the same as the case of FIG. 4 in which the notch 50a is not provided to the rotating shaft 50, it is possible to reduce the area of the air hole part 11b with the amount of the notch 50a provided to the rotating shaft 50.

By reducing the area of the air hole part 11b, the cross section area of the end ring 32 can be increased, the secondary resistance is decreased, and thus a highly efficient induction motor 100 can be obtained.

Further, FIG. 10 shows the notch 50a twisted to the circumferential direction of the rotating shaft 50. Generally, the rotor iron core 11a of the induction motor 100 is laminated with a skew. It is known that the induction motor 100 has abnormal phenomena such as synchronous torque, asynchronous torque, vibration/noise, etc., and the abnormal phenomena of the induction motor 100 is caused by space harmonics in air gap flux density as discussed above; in order to prevent induction of harmonics induced voltage at the aluminum bar 30 (the secondary conductor) of the rotor 11 caused by slot harmonics which is large among the space harmonics in the air gap flux density, the rotor iron core 11a of the induction motor 100 is laminated with a skew.

Because of this, the air hole part 11b is not placed vertically to the laminating direction, but twisted toward the circumferential direction.

In order to match the skew direction of the rotor iron core 11a, the notch 50a is placed twistedly, and thus it is possible to obtain the hermitic compressor with high performance by increasing the flow passage area without degrading the fitting strength of the shrink-fit.

In the rotor 11 of the induction motor 100 shown in FIG. 11, a shape of a notch 50a of the rotating shaft 50 is made an elongate hole (almost ellipse) shape so as to match the air hole part 11b of the elongate hole (almost ellipse) shape.

One elongate hole (almost ellipse) shaped air hole part 11b and one elongate hole (almost ellipse) shaped notch 50a form one air hole. In case of FIG. 11, three air holes are formed with an almost even interval in the circumferential direction. Here, the number of air holes is not limited to three. The number of air holes, the length in the circumferential direction, and the length of the radial direction can be arbitrarily chosen.

By forming the air hole part 11b into the elongate hole (almost ellipse) shape, the size of the diameter direction of the elongate hole (almost ellipse) shaped air hole part 11b can be shortened, and thus the end ring 32 can be enlarged toward the inner diameter side with the shortened amount.

If the air hole area being the flow passage of the refrigerant is the same, by providing the elongate hole (almost ellipse) shaped air hole part 11b, the depth of the notch (the depth in the radial direction) is shortened, and thus it is possible to suppress the degradation of the strength of the rotating shaft 50. Therefore, the highly reliable hermetic compressor can be obtained without degrading the strength of the rotating shaft 50.

As has been discussed, by providing the notch 50a to the rotating shaft 50 at the location facing the air hole part 11b as shown in FIG. 9, it is possible to increase the flow passage area for the refrigerant with the amount of the notch 50a without degrading the fitting strength of the shrink-fit.

Further, when the flow passage area is made the same as the case of FIG. 4 in which the notch 50a is not provided to the rotating shaft 50, the area of the air hole part 11b can be reduced with the amount of the notch 50a of the rotating shaft 50; by reducing the area of the air hole part 11b, the cross section area of the end ring 32 can be increased; the secondary resistance is decreased, and thus the highly efficient induction motor 100 can be obtained.

Further, in order to match the skew direction of the rotor iron core 11a, by providing the notch 50a twistedly, the flow passage area of refrigerant is increased without degrading the fitting strength of the shrink-fit, and thus a highly efficient hermetic compressor can be obtained.

Further, by forming the air hole part 11b into the elongate hole (almost ellipse) shape, the size of the diameter direction of the elongate hole (almost ellipse) shaped air hole part 11b can be shortened compared with the almost semi-circular air hole part 11b of FIG. 8 if the whole air hole area is the same, and thus the end ring 32 can be enlarged toward the inner diameter side with the shortened amount.

Further, if the air hole area being the flow passage of the refrigerant is the same, by providing the elongate hole (almost ellipse) shaped 50a, the depth of the notch (the depth in the radial direction) is shortened, and thus it is possible to suppress the degradation of the strength of the rotating shaft 50. Therefore, the highly reliable hermetic compressor can be obtained without degrading the strength of the rotating shaft 50.

Embodiment 3

Hereinafter, the third embodiment will be explained with reference to the figures. FIGS. 12 and 13 show the third embodiment and are plan views of the rotor 11 (excluding the rotating shaft 50) of the induction motor 100.

In FIG. 12, when it is assumed that the size of the outer diameter of the rotor 11 is A, and a distance between the inner diameter of the rotor 11 and the inner diameter of the end ring 32 is B, the air hole part 11b is provided to the rotating shaft hole 31 of the rotor 11, and the size of the inner diameter of the end ring 32 is enlarged toward the inner diameter side so that it should be B<0.1A.

When the rotor 11 is mounted on the hermetic compressor, since the air hole part 11b is provided to the rotating shaft hole 31, the flow passage of the refrigerant is secured, and thus the hermetic compressor with high performance can be obtained. Further, it is possible to obtain the highly reliable hermetic compressor with suppressing the oil amount flowing out of the hermetic compressor.

In FIG. 13, three air hole parts 11b (here, elongate hole (almost ellipse) shaped) are provided to the rotating shaft hole 31, and when it is assumed that an angle formed by straight lines connecting the center of the rotating shaft 50 and both edges of the air hole part 11b (intersections with the arc of the rotating shaft hole 31) is $\alpha$, and an angle formed by two edges of two adjacent air hole parts 11b at closer sides and the center of the rotating shaft 50 is $\beta$, it is set so that $\alpha+\beta \approx 120$ [degrees], and $2\alpha+\beta < 180$ [degrees].

When the three air hole parts 11b are provided with an almost equal interval, $\alpha+\beta \approx 120$ [degrees]; however, if $\alpha$ is made large compared with $\beta$, there is a problem that the fitting strength may be degraded even if the rotating shaft 50 and the rotor 11 are shrink-fitted.

Further, when $2\alpha+\beta$ is 180 degrees or more, the straight line which passes the center of the rotating shaft hole 31 does not pass the two points of the arc of the rotating shaft hole 31. Namely, the straight line passing the center of the rotating shaft hole 31 and the arc of the rotating shaft hole 31 passes the air hole part 11b on the opposite side (180 degrees) of the arc of the rotating shaft hole 31. Therefore, if fit dimension with the rotating shaft 50 is managed, it is hard to measure easily the inner diameter of the rotating shaft hole 31 of the rotor 11.

In the present embodiment, by setting $2\alpha+\beta<180$ [degrees], the measurement of the inner diameter of the rotating shaft hole 31 is facilitated, and thus it is possible to obtain the rotor 11 of the induction motor 100, for which the fit dimension with the rotating shaft 50 can be managed easily.

Embodiment 4

Hereinafter, the fourth embodiment will be explained with reference to the figures. FIGS. 14 through 16 show the fourth embodiment; FIG. 14 is a vertical cross sectional view of a rotating compressor 300 (an example of the hermetic compressor); and FIGS. 15 and 16 are horizontal cross sectional views of the rotating compressor 300.

The structure of the rotating compressor 300 except the induction motor 100 is a known one. Accordingly, the structure of the one cylinder rotating compressor 300 will be briefly explained with reference to FIG. 14.

As shown in FIG. 14, the rotating compressor 300 includes a compressor element 200, the induction motor 100 being a motor element, and refrigerating oil, not illustrated, in a hermetic container 4. The refrigerating oil is reserved in the bottom part of the hermetic container 4. The refrigerating oil mainly lubricates a sliding part of the compressor element 200. The hermetic container 4 is composed of a body part 1, an upper plate container 2, and a lower plate container 3.

The compressor element 200 is composed of a cylinder 5, an upper bearing 6 (an example of a bearing), a lower bearing 7 (an example of bearing), a rotating shaft 50, a rolling piston 9, a discharge muffler 8, a vane (not illustrated), etc.

The cylinder 5, inside of which a compression space is formed, has a cylinder space whose outer circumference is an almost circle in planar view and inside of which the cylinder space being an almost circle in planar view is provided. The cylinder space has an opening at both edges in the axial direction. The cylinder 5 has a predetermined height in side view in the axial direction.

Parallel vane grooves (not illustrated), which connect to the cylinder space being the almost circular space of the cylinder 5 and extend in the radial direction, are penetrated in the axial direction.

Further, a backpressure space (not illustrated), which is a space of an almost circle in planar view and connects to the vane grooves, is provided to the back (the outside) of the vane grooves.

In the cylinder 5, a suction port (not illustrated), to which suction gas from the refrigerant cycle passes, penetrates the cylinder space from the outer circumferential surface of the cylinder 5.

In the cylinder 5, a discharge port (not illustrated), which is formed by cutting a part close to the edge (the edge at the induction motor 100 side) of the circle that forms the almost circular cylinder space, is provided.

The rolling piston 9 eccentrically rotates in the cylinder space. The rolling piston 9 is ring shaped and fitted so that an inner circumference of the rolling piston 9 is slidably fitted to an eccentric shaft part 50d of the rotating shaft 50.

The vane is included in the vane groove of the cylinder 5, and the vane is always pressed to the rolling piston 9 with a vane spring (not illustrated) provided to the backpressure space. In the rotating compressor 300, since the inside of the hermetic container 4 is high pressured, when the operation starts, a force caused by a pressure difference between the high pressure in the hermetic container 4 and the pressure of the cylinder space is worked on the back (the backpressure space side) of the vane, the vane spring is used for pressing the vane to the rolling piston 9 at the time of starting (when the inside of the hermetic container 4 and the cylinder space have no pressure difference).

The vane has a shape of an almost flat cube (the thickness in the circumferential direction is smaller than the length in the diameter direction and the axial direction).

The upper bearing 6 is slidably fitted to a main shaft part 50b of the rotating shaft 50 (a part above the eccentric shaft part 50d) and closes one of the edges (the induction motor 100 side) of the cylinder space (including the vane groove).

A discharge valve (not illustrated) is provided to the upper bearing 6. The upper bearing 6 has an almost inverse T shape in side view.

The lower bearing 7 is slidably fitted to an auxiliary shaft part 50c (a part below the eccentric shaft part 50d) of the rotating shaft 50, and closes the other edge (the refrigerating oil side) of the cylinder space (including the vane groove) of the cylinder 5. The lower bearing 7 has an almost T shape in side view.

A discharge muffler 8 is provided at the outer side (the induction motor 100 side) of the upper bearing 6. Discharge gas of high temperature/high pressure discharged from the discharge valve of the upper bearing 6 inflows to the discharge muffler 8 once, and then is blown to the inside of the hermetic container 4 from a discharge hole 8a of the discharge muffler 8.

At the side of the hermetic container 4, a suction muffler (not illustrated), which suppresses direct suction of liquid refrigerant to the cylinder space when the liquid refrigerant returns, is provided. The suction muffler is connected to the suction port of the cylinder 5 through the suction tube 22. The suction muffler is fixed to the side surface of the hermetic container 4 by welding, etc.

The gas refrigerant of high temperature/high pressure which is compressed by the compressor element 200 passes from the discharge hole 8a of the discharge muffler 8 through the induction motor 100 and is discharged to an external refrigerant circuit (not illustrated) from the discharge tube 70.

The relationship between locations of the discharge hole 8a being a part of the compressor element 200 and the air hole part 11b of the rotor 11 being a part of the induction motor 100 will be explained with reference to FIGS. 15 and 16. Here, a case will be explained, in which the number of the discharge holes 8a of the discharge muffler 8 is three, and the number of the air hole parts 11b of the rotor 11 is also three. The discharge holes 8a of the discharge muffler 8 are placed with an almost equal interval in the circumferential direction as well as the air hole part 11b of the rotor 11.

As discussed above, a part of the gas refrigerant compressed by the compressor element 200 passes the air hole part 11b from the discharge hole 8a; since the gas refrigerant is high pressure, the flow speed is also high. In the present embodiment, the number of holes and the locations are matched between the discharge holes 8a and the air hole parts 11b, and further the locations of the discharge holes 8a and the air hole parts 11b should be almost matched when the high-pressure discharge gas is discharged from the discharge hole 8a, so that the refrigerant should pass more efficiently from the air hole part 11b.

At every rotation of the rotor 11 of the induction motor 100, the compressor element 200 carries out one-time compression/discharge; when the locations of the discharge hole 8a and the air hole part 11b are almost matched, the high-pressure discharge gas is made discharged from the discharge hole 8a.

By making the number of holes and the locations matched between the discharge holes 8a and the air hole parts 11b, and further the locations of the discharge holes 8a and the air hole parts 11b almost matched when the high-pressure discharge gas is discharged from the discharge hole 8a, it is possible to allow the refrigerant to pass more efficiently from the air hole part 11b, and the highly efficient rotation compressor 300 can be obtained.

Here, the case has been explained in which the numbers of the discharge hole 8a and the air hole part 11b are the same; the same effect can be obtained if the phases match, so that the relation of the respective numbers can be integral multiple, for example, such as a case in which the number of the discharge hole 8a is three and the number of the air hole part 11b is six.

Further, in order to increase the passage amount of the gas refrigerant to the air hole part 11b, it is more desirable to closely provide the discharge hole 8a to the center of the rotating shaft 50; however, the embodiment is not limited to such a case.

EXPLANATION OF SIGNS

Figure 1:
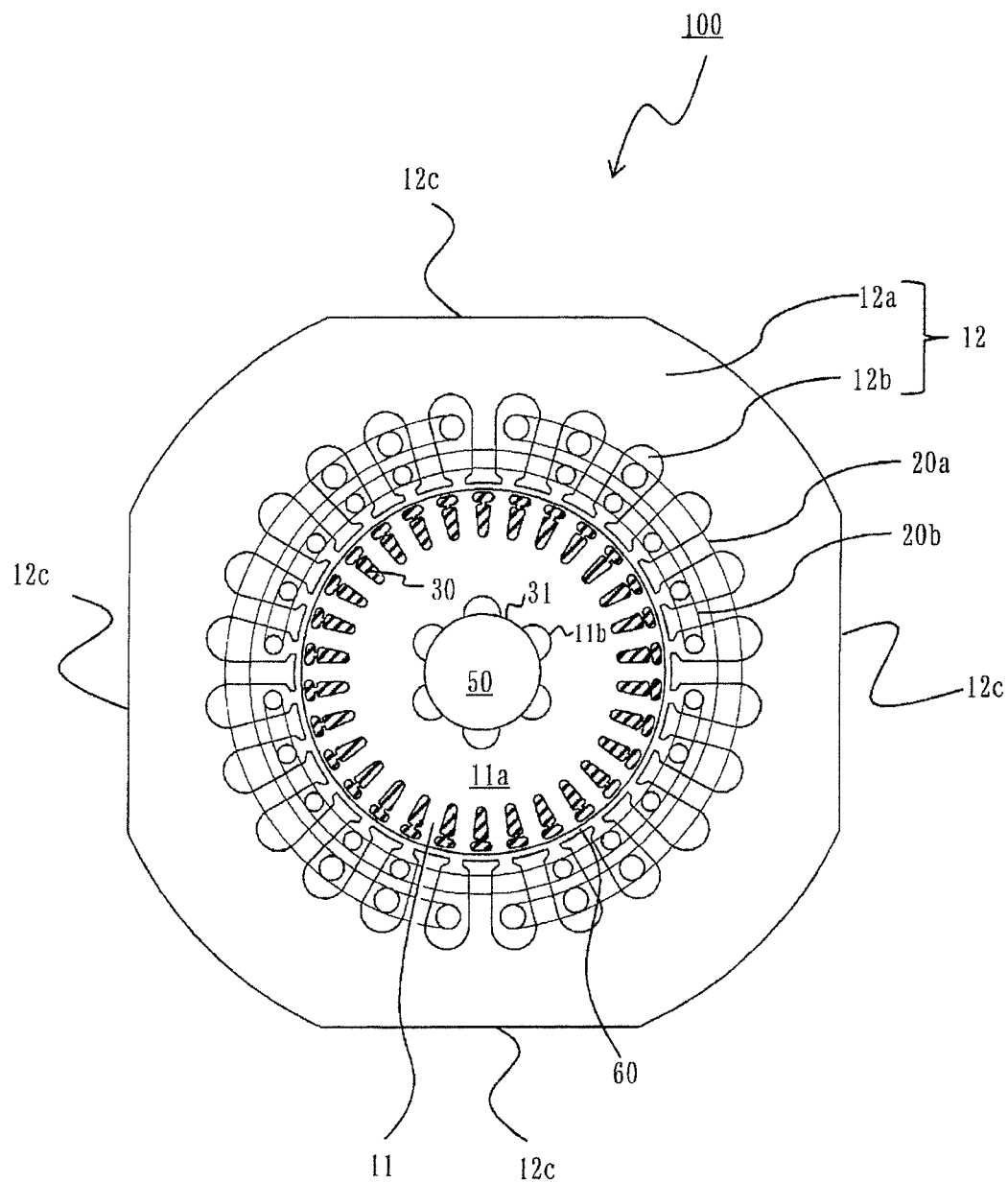
FIG. 1 shows the first embodiment and is a cross sectional view of an induction motor 100.
Figure 2:
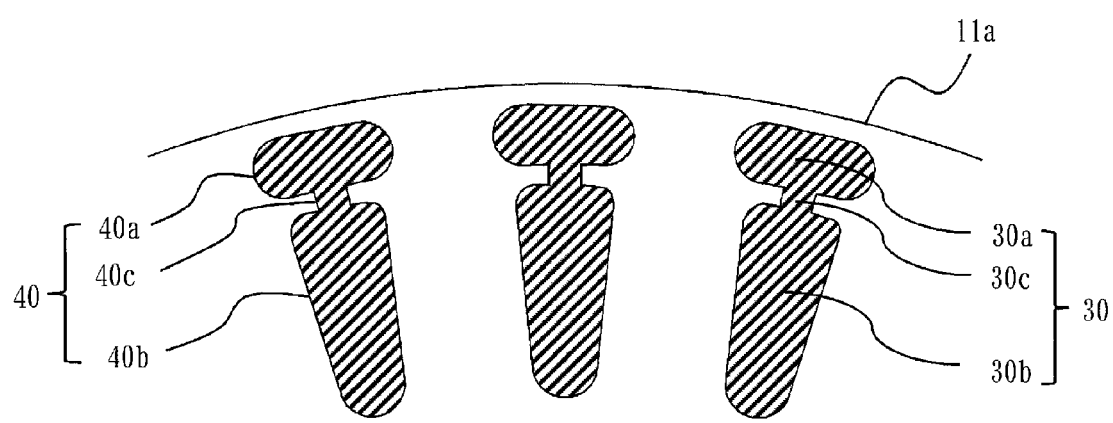
FIG. 2 shows the first embodiment and is a cross sectional view of a rotor slot 40 in which an aluminum bar 30 is filled.
Figure 3:
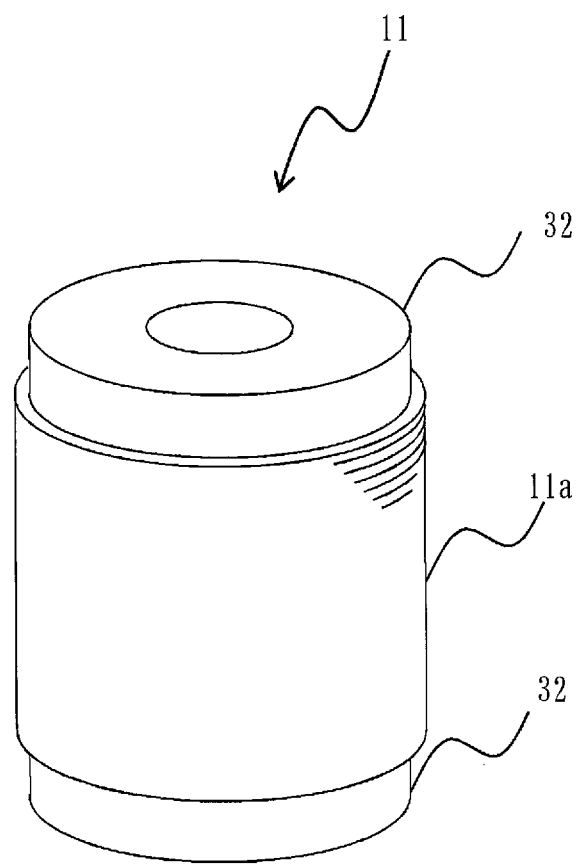
FIG. 3 shows the first embodiment and is a perspective view of a rotor 11 of an induction motor 100.
Figure 4:
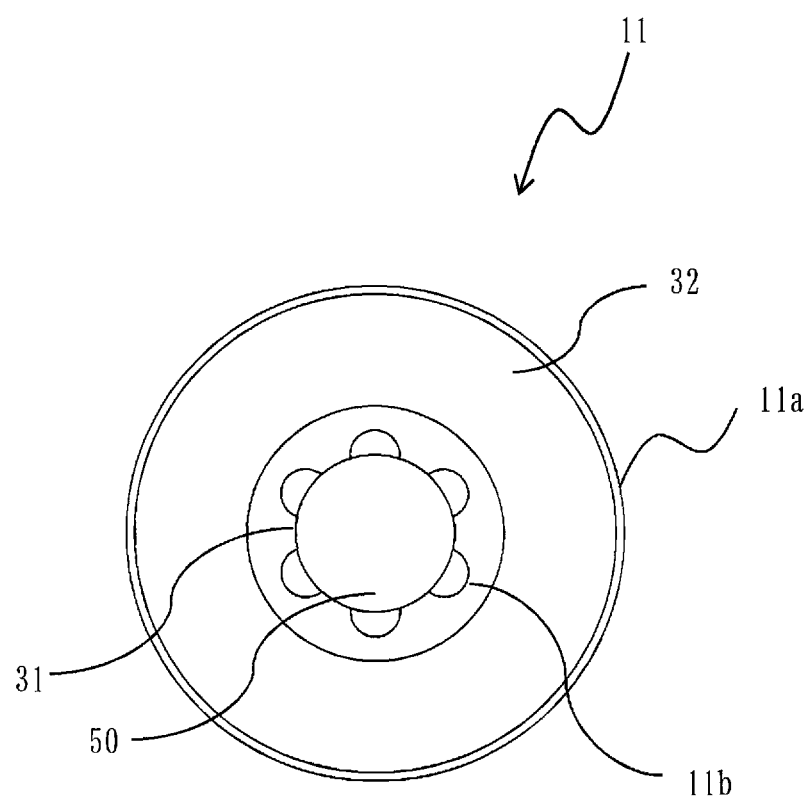
FIG. 4 shows the first embodiment and is a perspective view of a rotor 11 of an induction motor 100.
Figure 5:
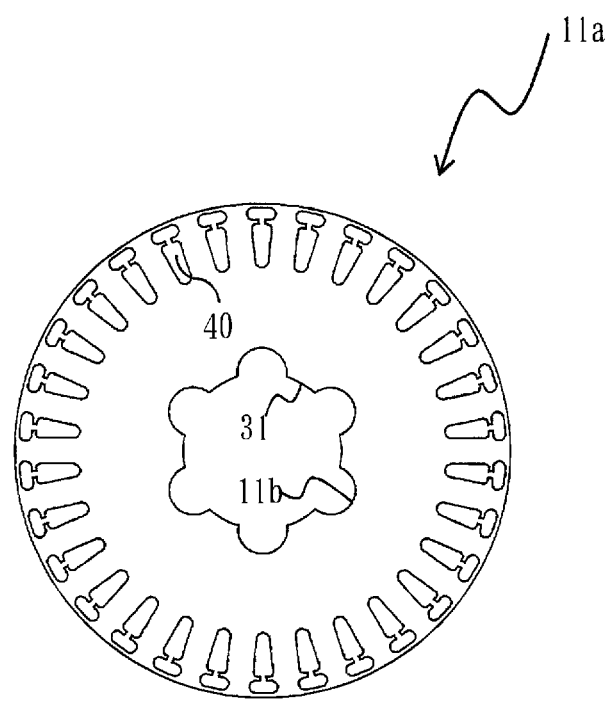
FIG. 5 shows the first embodiment and is a plan view of the rotor 11 of the induction motor 100.
Figure 6:
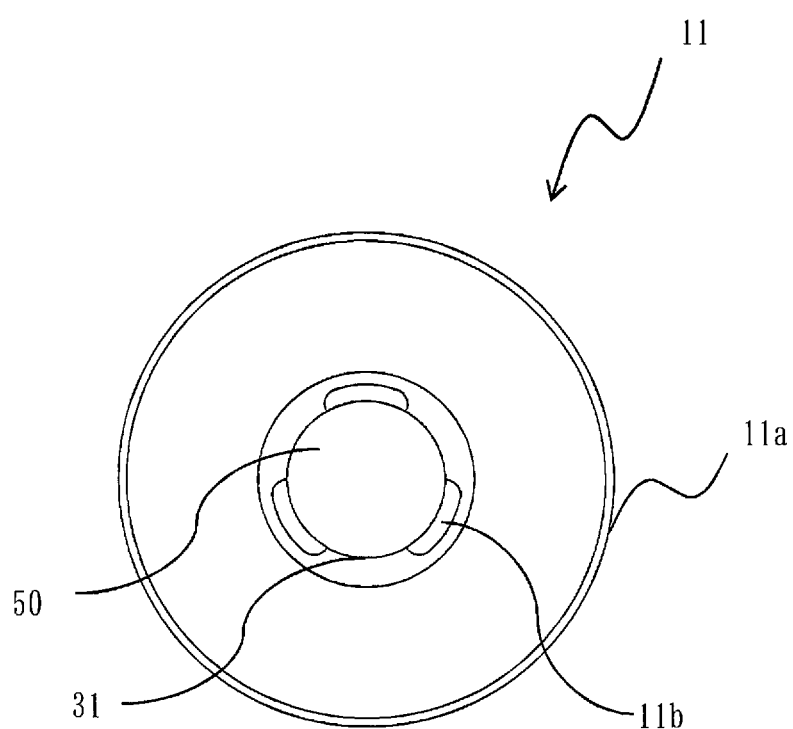
FIG. 6 shows the first embodiment and is a plan view of a rotor iron core 11a of the induction motor 100.
Figure 7:
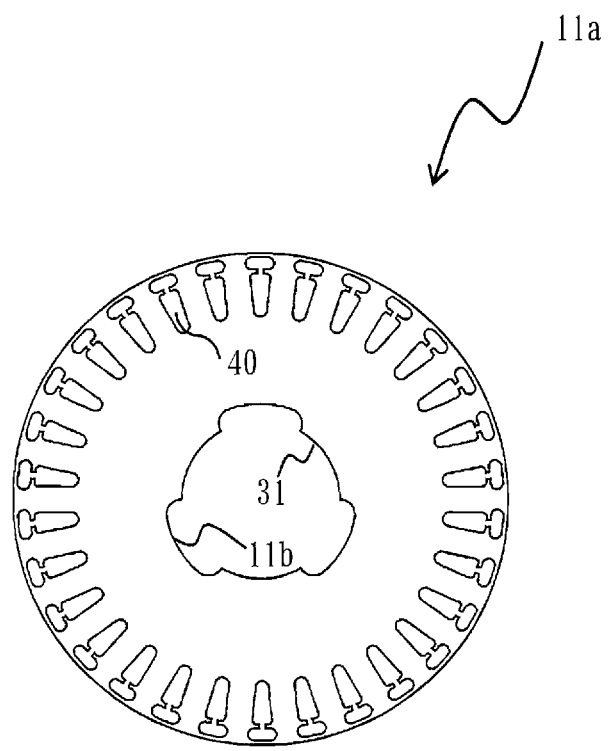
FIG. 7 shows the first embodiment and is a plan view of the rotor 11 of a deformed example of the induction motor 100.
Figure 8:
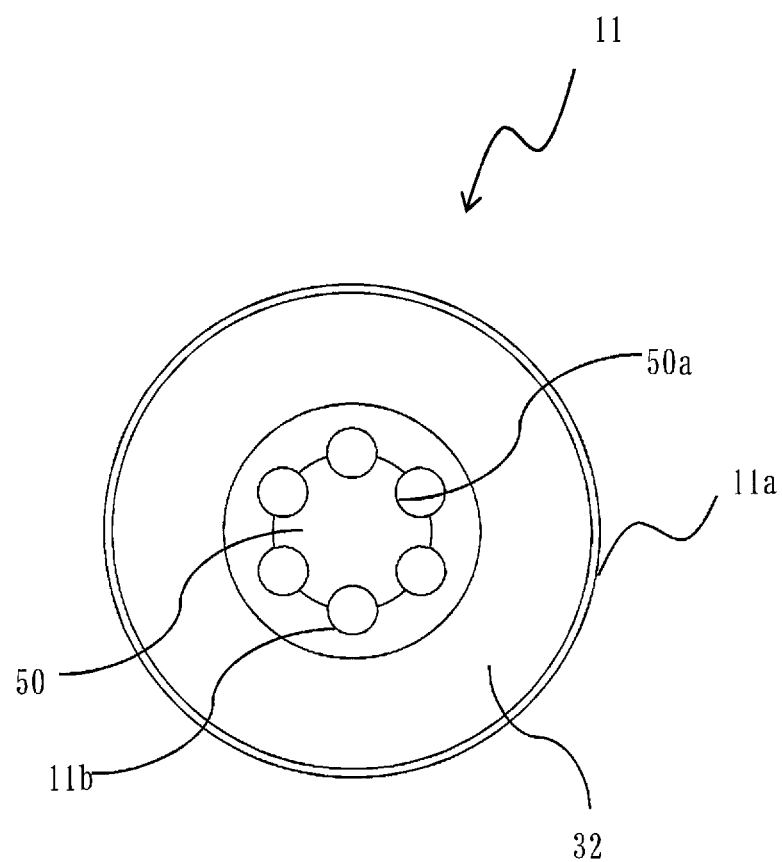
FIG. 8 shows the second embodiment and is a plan view of the rotor 11 of the induction motor 100.
Figure 9:
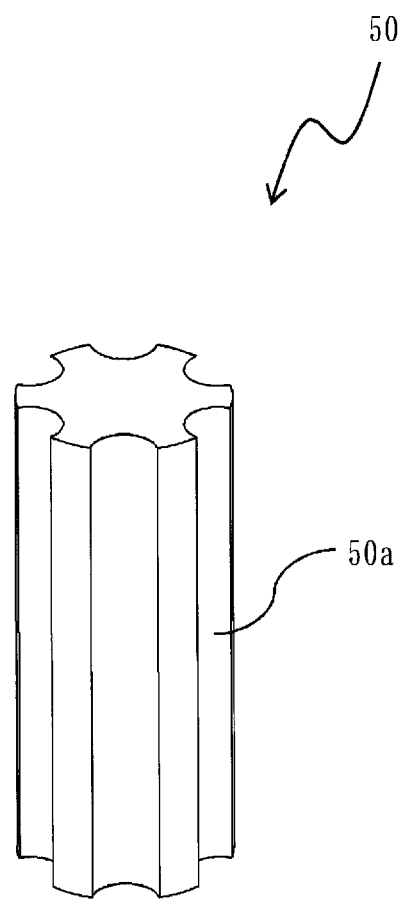
FIG. 9 shows the second embodiment and is a perspective view of a part of a rotating shaft 50 (a part corresponding to the length of the rotor 11 in the laminating direction).
Figure 10:
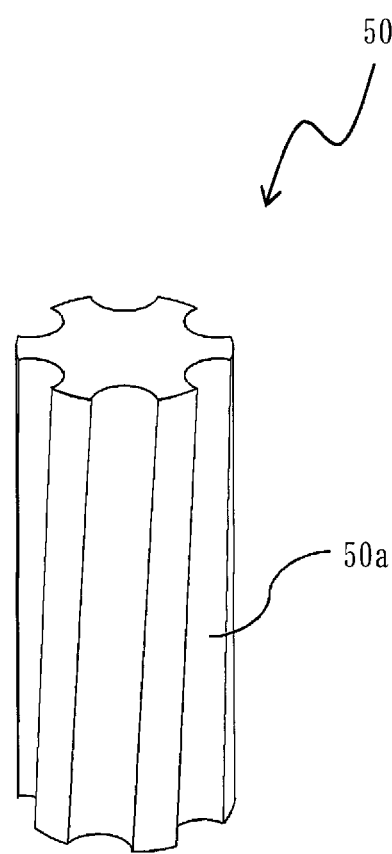
FIG. 10 shows the second embodiment and is a perspective view of the part of the rotating shaft 50 (the part corresponding to the length of the rotor 11 in the laminating direction).
Figure 11:
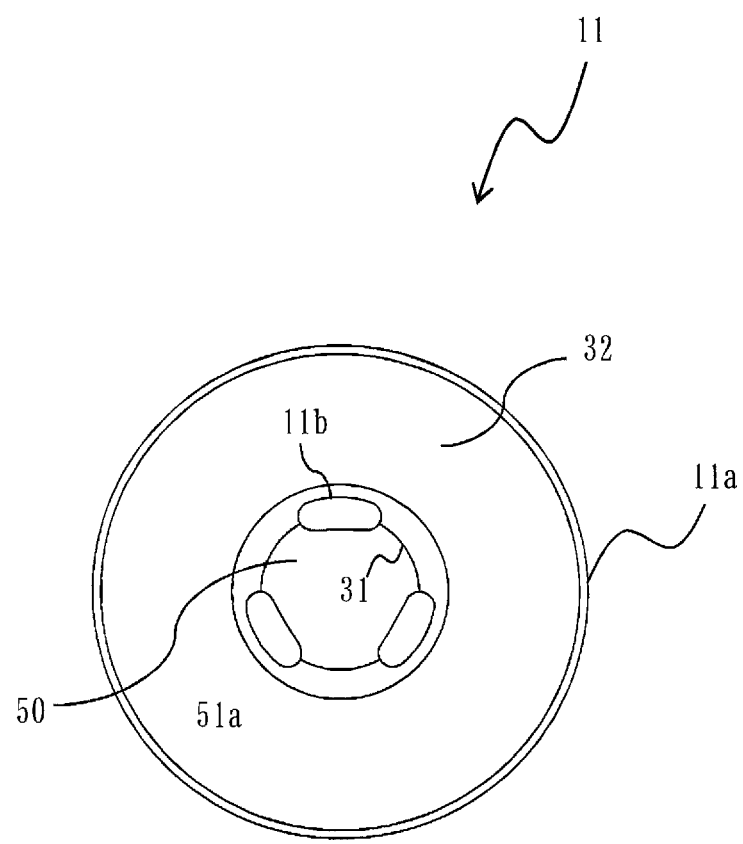
FIG. 11 shows the second embodiment and is a plan view of the rotor 11 of the induction motor 100.
Figure 12:
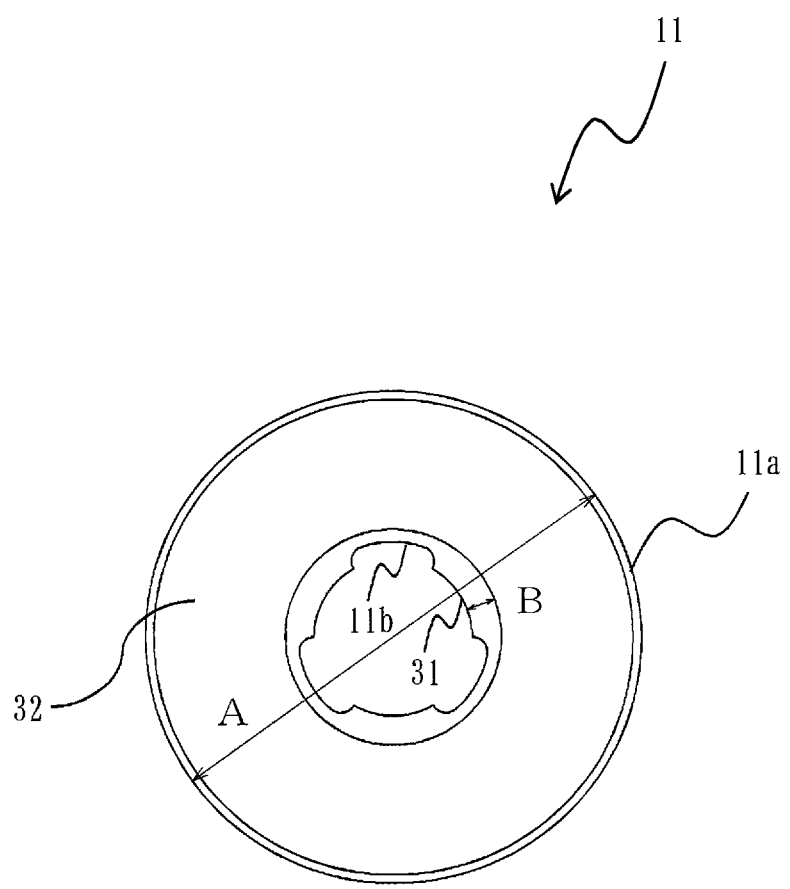
FIG. 12 shows the third embodiment and is a plan view of the rotor 11 (excluding the rotating shaft 50) of the induction motor 100.
Figure 13:
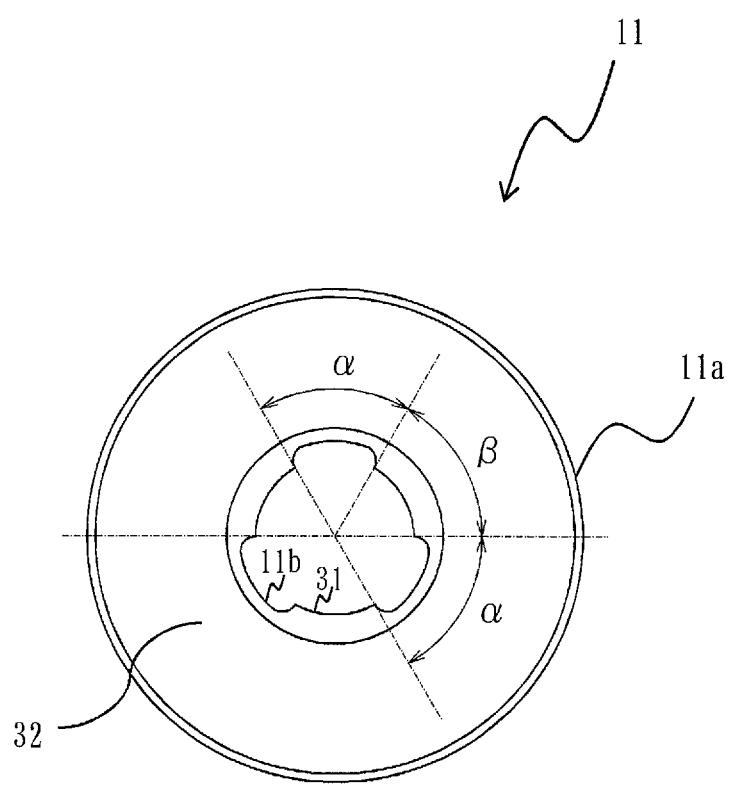
FIG. 13 shows the third embodiment and is a plan view of the rotor 11 (excluding the rotating shaft 50) of the induction motor 100.
Figure 14:
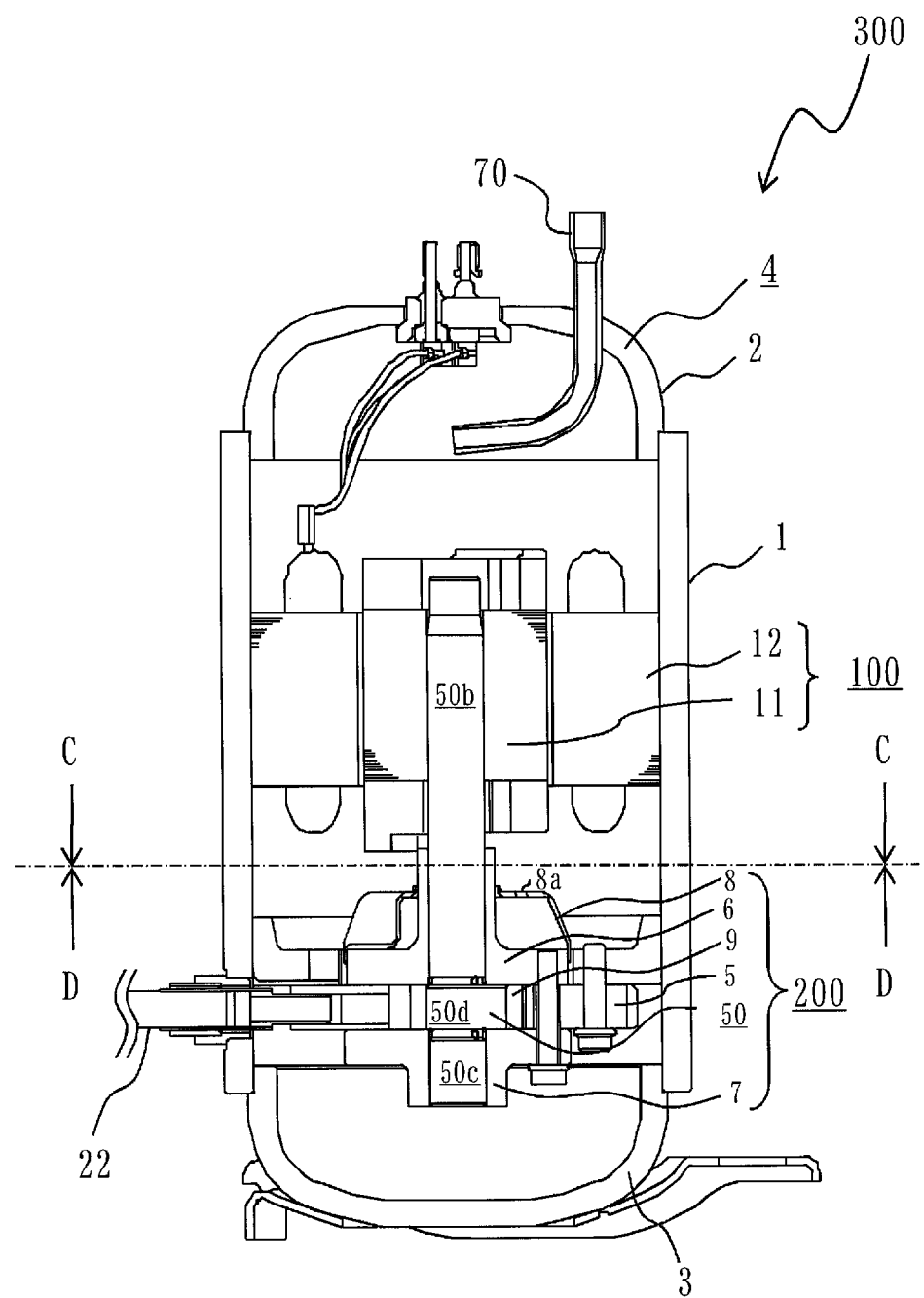
FIG. 14 shows the fourth embodiment and is a vertical cross sectional view of a rotating compressor 300.
Figure 15:
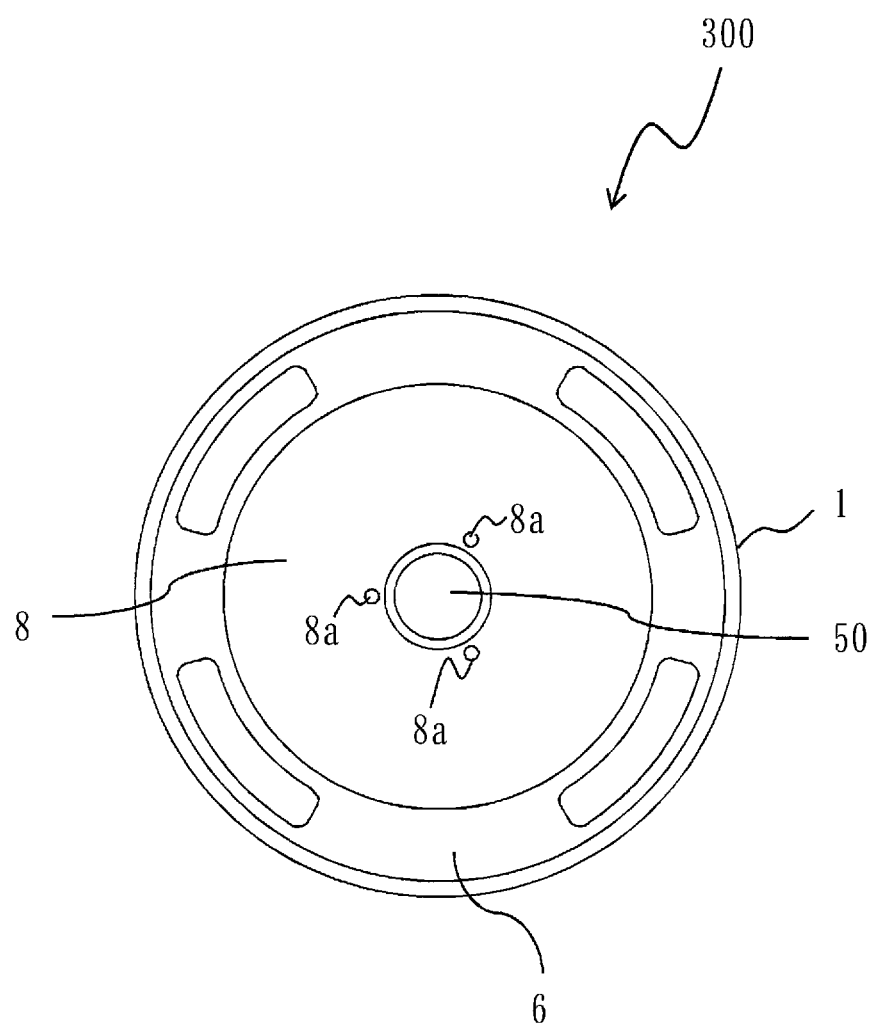
FIG. 15 shows the fourth embodiment and is a horizontal cross sectional view of the rotating compressor 300.
Figure 16:
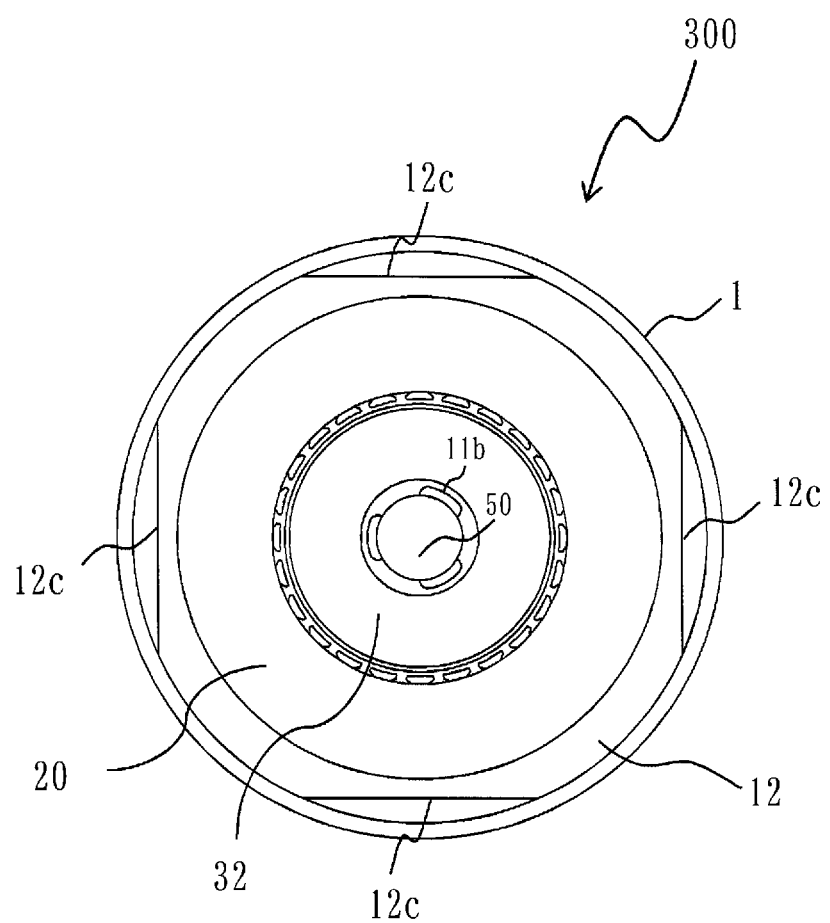
FIG. 16 shows the fourth embodiment and is a horizontal cross sectional view of the rotating compressor 300.

1: a body part; 2: an upper plate container; 3: a lower plate container; 4: a hermetic container; 5: a cylinder; 6: an upper bearing; 7: a lower bearing; 8: a discharge muffler; 8a: a discharge hole; 9: a rolling piston; 11: a rotor; 11a: a rotor iron core; 11b: an air hole; 12: a stator; 12a: a stator iron core; 12b: a stator slot; 12c: a stator notch; 20: a winding; 20a: an auxiliary winding; 20b: a main winding; 30: an aluminum bar; 30a: an outer layer aluminum bar; 30b: an inner layer aluminum bar; 30c: a connection aluminum bar; 31: a rotating shaft hole; 32: an end ring; 40: a rotor slot; 40a: an outer layer slot; 40b: an inner layer slot; 40c: a connection slot; 50: a rotating shaft; 50a: a notch; 50b: a main shaft part; 50c: an auxiliary shaft part; 50d: an eccentric shaft part; 60: a gap; 70: a discharge tube; 100: an induction motor; 200: a compressor element; and 300: a rotating compressor.

The invention claimed is:

1. An induction motor comprising:
a stator having a stator iron core produced by laminating a predetermined number of electromagnetic steel plates which have been punched out into a predetermined form, a plurality of stator slots formed along an inner circumferential edge of the stator iron core, and windings inserted into the stator slots; and
a rotor placed inside of the stator via a gap,
the rotor including:
a rotor iron core produced by laminating a predetermined number of electromagnetic steel plates which have been punched out into a predetermined form;
a plurality of double squirrel-cage rotor slots formed along an outer circumferential edge of the rotor and filled with conductive material; and
three air hole parts provided around a rotating shaft hole of the rotor iron core to which a rotating shaft is fitted and having an opening which is open to the rotating shaft hole,
wherein an inner diameter part of at least one of end rings which short circuit both edges of the conductive material filled into the double squirrel-cage rotor slots is placed adjacent to the air hole parts, and
wherein the three air hole parts are placed with an almost equal interval, so that $2\alpha+\beta<180$ degrees, where an angle formed by both edges of one of the air hole parts and a center of the rotor shaft is $\alpha$, and an angle formed by two edges of a closer side of two adjacent air hole parts and the center of the rotor shaft is $\beta$.

2. The induction motor of claim 1, wherein the rotor and the rotating shaft are fitted by shrink-fit.

3. The induction motor of claim 1, wherein the air hole parts are almost semi-circular shaped.

4. The induction motor of claim 1, wherein the air hole parts are elongate hole shaped.

5. The induction motor of claim 1,
wherein notches are provided to the rotating shaft in an almost axial direction throughout the shaft at locations facing the air hole parts provided to the rotor, and
wherein the air hole parts and the notches form air holes.

6. The induction motor of claim 5, wherein the notches provided to the rotating shaft in the almost axial direction throughout the shaft are elongate hole shaped.

7. The induction motor of claim 5,
wherein the rotor iron core is laminated with skew, and
wherein the notches are twisted corresponding to a skew angle of the rotor iron core.

8. The induction motor of claim 1 contained in a hermetic container together with a compressor element for compressing refrigerant and driving the compressor element by the rotating shaft,
wherein the compressor element comprises discharge holes for discharging the compressed refrigerant, a number of holes and locations of the discharge holes and the air hole parts are matched, and locations of the discharge holes and the air hole parts are almost matched when high-pressure discharge gas is discharged from the discharge holes.

9. A hermetic compressor having the induction motor of claim 1 and a compressor element to be driven by the induction motor.

* * * * *